(No Model.)

C. S. BRADLEY.
SECONDARY BATTERY.

No. 312,802. Patented Feb. 24, 1885.

Witnesses
Edw'd F. Davis
Jos. S. Latimer

Inventor
Charles S. Bradley
By his Attorneys
Curtis & Crocker

UNITED STATES PATENT OFFICE.

CHARLES S. BRADLEY, OF YONKERS, ASSIGNOR TO THE BRADLEY ELECTRIC POWER COMPANY, OF NEW YORK, NEW YORK.

SECONDARY BATTERY.

SPECIFICATION forming part of Letters Patent No. 312,802, dated February 24, 1885.

Application filed April 19, 1884. (No model.)

*To all whom it may concern:*

Be it known that I, CHARLES S. BRADLEY, a citizen of the United States, residing at Yonkers, in the county of Westchester and State of New York, have invented certain new and useful Improvements in Secondary Batteries, of which the following is a specification.

My invention relates to secondary electric batteries.

The difficulty heretofore experienced in the use of secondary batteries has been the great bulk and weight of such batteries compared with the amount of electrical energy which they are capable of giving out, and the inconstancy of the current produced by them, due to the fall or decline in electro-motive force, or to the increase of resistance, and there has also been found to be considerable loss of energy, the electrical energy obtainable by discharging the battery being considerably less than that required to charge it, and this loss increases with the time which elapses between the charging and discharging.

The object of my invention is to overcome these objections and to produce a convenient, compact, and efficient battery capable of storing the maximum amount of energy with the least possible weight.

The accompanying drawings illustrate the general arrangement and mode of operation of the battery which I have invented.

Figure 1:
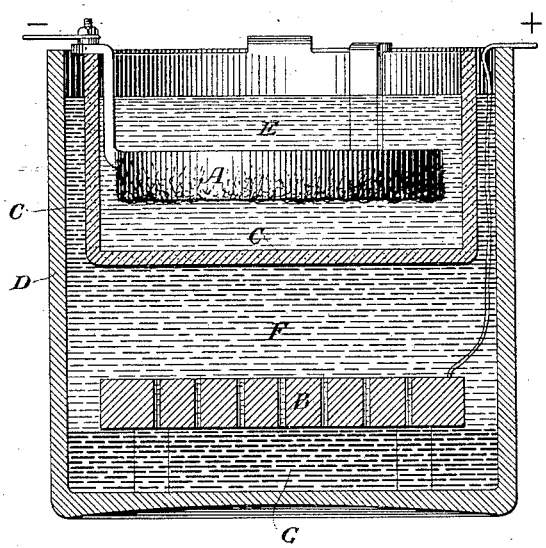
Figure 2:
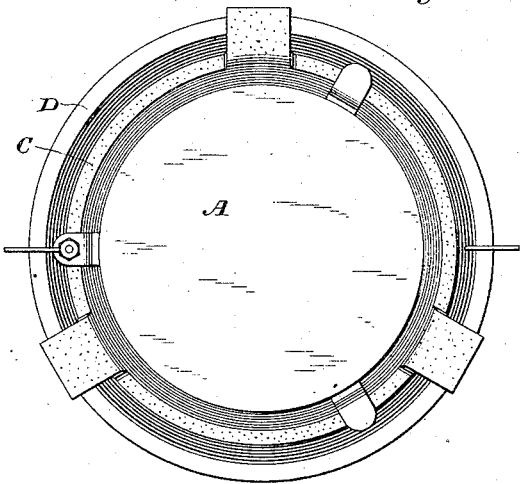

Figure 1 represents a vertical section of a cell of my battery. Fig. 2 is a plan view of the same.

The same letters of reference refer to identical parts in the two figures.

D is a containing-vessel of any convenient form. In the bottom of this vessel is placed a perforated plate, B, of carbon or other suitable material. This plate does not rest immediately upon the bottom of the vessel, but is raised up a certain distance, so that there is space beneath it. A porous cell, C, is set into the vessel D, as shown. Within this porous cell a zinc plate, A, is suspended by means of hangers, or in any other convenient manner. Both the vessel D and the porous cell C are then filled with a nearly-saturated solution of zinc bromide (one part of water dissolves three parts, by weight, of zinc bromide) up to the proper level, as shown in Fig. 1. The cell is then in a condition to be employed as a secondary battery, and it is charged by connecting the zinc plate A to the negative pole and the carbon plate B to the positive pole of a dynamo-electric machine, or other source of electrical energy, and a current is caused to pass through the cell. The effect of this will be that the zinc bromide will be decomposed by the electrolytic action of the current, and zinc will be deposited upon the zinc plate A, and bromine will be set free upon the carbon plate B. This bromine will be dissolved by the water as fast as it is produced until the water becomes saturated with it. Then the excess set free after this will settle upon the bottom of the vessel, since it is specifically heavier than the solution, and a layer of it will form under the carbon plate B. This accumulation of bromine is shown at G in Fig. 1. The free bromine which is dissolved by the water is kept from coming in contact with the zinc by the porous cell C. When the zinc bromide in the solution has been almost all decomposed by the action of the current, (it is best to leave a little undecomposed in order to maintain the necessary conductivity,) the battery is disconnected from the dynamo, and is now charged and ready to be used for any purpose to which secondary batteries are applicable. When the battery is discharged, the action will be exactly the reverse of what it was in charging. Zinc will be taken up from the positive plate A, upon which it was deposited in charging, and bromine will be taken up at the negative plate B, and zinc bromide will be formed which will go into solution, the bromine thus taken up at the negative plate being that which is present in the solution in the water, and the accumulation G of bromine in the bottom of the vessel supplies the solution as fast as the bromine is removed from it in this way. Finally all the bromine will have combined with the zinc, and the battery will then have to be recharged, and so on.

I have found by actual experiment that a battery made in the manner which I have shown and described will operate very well; but I do not confine myself to the exact arrangement set forth.

I have constructed and worked a battery which differs from the hereinbefore-described battery in not being provided with a porous cell, and in cases where the charge is only held temporarily this battery will answer very well.

I propose in subsequent applications to describe and claim various arrangements and features of my battery. In the present application I have shown and described it in its simple form; but it is evident that many different forms and compositions of vessels or compartments for containing the solution of porous cells or diaphragms and of electrodes may be employed without departing from my invention. I am aware that in English Patent (having only incomplete or provisional specification) No. 2,823 of 1881, iodide of zinc has been suggested as an electrolyte for a secondary battery; but there are several serious objections to the employment of this salt.

First. Iodine, being a solid at ordinary temperatures, is essentially different in its action from bromine, which is a liquid. When a battery containing a solution of zinc iodide is charged with electricity, the iodine will at first be dissolved, it being soluble in the solution of an iodide, but as the iodide becomes exhausted from the solution the latter will not take up more iodine, as water itself dissolves only one seven-thousandth of its weight—practically none at all. The result will be that solid iodine will be deposited upon the negative electrode, and, since it is a non-conductor of electricity, it will stop the passage of the current through the cell; but bromine under similar circumstances, being a liquid, would run down in the bottom of cell away from the electrode and not interfere with the action of the cell, as has been already explained in this specification. Furthermore, bromine is much more soluble in water than iodine.

Second. Iodine diffuses much less rapidly than bromine, and when a battery is being rapidly discharged the iodine will become exhausted from the solution near the electrode, and the current will thereby be weakened, which is not the case with bromine.

Third. The electro-motive force of a cell in which the electrolyte is zinc iodide is only 1.2 volt immediately after charging, but falls below this point as soon as the discharging begins, whereas a cell in which zinc bromide is employed gives 1.8 volt, which electro-motive force is perfectly constant and does not fall one-hundredth of a volt, even when the cell is rapidly discharged.

Fourth. The energy produced by a given weight of bromine combining with zinc is two and one-half times as great as that produced by the same weight of iodine in combining with zinc. A secondary battery containing zinc iodide would therefore weigh a great deal more, and would occupy much more space than one capable of storing an equal amount of energy in which the electrolyte was zinc bromide, which is the salt that I employ. Finally, the cost of iodine is at least six times as great per given weight as that of bromine.

Having now described my invention, what I claim as new, and desire to secure by Letters Patent, is—

1. A secondary electric battery in which the electrolyte is a solution of a metallic bromide which is decomposed when the battery is charged, the metal being deposited upon one electrode and the bromine being set free at the other electrode, substantially as described.

2. A secondary electric battery in which the electrolyte is a solution of zinc bromide which is decomposed when the battery is charged, the zinc being deposited upon one electrode and the bromine being set free at the other electrode, the bromine thus liberated being taken up by the solution and any excess accumulating in the free state, substantially as described.

3. A secondary electric battery in which the electrolyte is a solution of a metallic bromide which is decomposed when the battery is charged, the metal being deposited upon one electrode and the bromine being set free at the other electrode, the two electrodes being separated by a porous cell or diaphragm, which prevents the bromine from coming in contact with the metal deposited upon the first electrode, substantially as described.

4. A secondary electric battery in which the electrolyte is a solution of a metallic bromide which is decomposed when the battery is charged, the metal being deposited upon one electrode and bromine being set free at the other, the electrode upon which the metal is deposited being placed above the one on which the bromine is set free, whereby the free bromine tends to remain near the lower electrode and to keep away from the electrode upon which the metal is deposited, substantially as described.

Signed this 18th day of April, 1884.

CHARLES S. BRADLEY.

Witnesses:
    F. B. CROCKER,
    CHAS. G. CURTIS.